United States Patent [19]
Michler

[11] Patent Number: 5,769,487
[45] Date of Patent: Jun. 23, 1998

[54] CHUCKING DEVICE FOR ACCURATE MUTUAL FIXATION OF TWO MEMBERS

[75] Inventor: Gerhard Michler, Ilsfeld, Germany

[73] Assignee: Fritz Schunk GmbH & Co KG Fabrik Für Spann-und Greifwerkzeuge, Germany

[21] Appl. No.: 677,523

[22] Filed: Jul. 10, 1996

[30] Foreign Application Priority Data

Jul. 13, 1995 [DE] Germany .................. 195 25 574.7

[51] Int. Cl.⁶ .................................................. B23B 31/40
[52] U.S. Cl. .................. 279/2.08; 279/4.03; 269/48.1; 403/5
[58] Field of Search ................ 279/2.08, 4.03; 269/48.1; 403/5, 31

[56] References Cited

U.S. PATENT DOCUMENTS

| | | | |
|---|---|---|---|
| 2,963,298 | 12/1960 | Better et al. | 279/4.03 |
| 3,130,978 | 4/1964 | Van Roojen | 279/2.08 |
| 3,760,652 | 9/1973 | Joyard et al. | 269/48.1 |

FOREIGN PATENT DOCUMENTS

| | | | |
|---|---|---|---|
| 943872 | 6/1956 | Germany | 279/4.03 |
| 29 02 919 | 8/1979 | Germany . | |
| 30 07 307 | 7/1981 | Germany . | |
| 31 08 249 | 9/1982 | Germany . | |
| 38 00 696 | 7/1989 | Germany . | |

OTHER PUBLICATIONS

Seegräber et al., *Dehnspanntechnik—die µ–genaue Alternative*, pp. 609, 610, 613, 614, Werkstatt und Betrieb 127 (1994).

Fritz Schunk GmbH, Hydraulic Expansion Chuck, Technical description, 9 pages May, 1990.

*Primary Examiner*—Steven C. Bishop
*Attorney, Agent, or Firm*—Baker, Maxham Jester & Meador

[57] ABSTRACT

A chucking device for accurate mutual fixation of disk-shaped parts or rotationally symmetrical parts. The device has a chucking element that engages with members in a form-fitting manner and has an expansion sleeve that together with the chucking element forms the border of a pressure chamber filled with an incompressible medium. Due to a relative axial movement between the chucking element and the expansion sleeve, the medium enclosed in the pressure chamber is pressed against the wall of the expansion sleeve, which thus comes in pressure contact with the corresponding peripheral surfaces of the two members.

15 Claims, 2 Drawing Sheets

CHUCKING DEVICE FOR ACCURATE MUTUAL FIXATION OF TWO MEMBERS

BACKGROUND

1. Field of the Invention

The invention concerns chucking devices for accurate mutual fixation of disk-shaped parts or rotationally symmetrical parts.

2. Discussion of the Prior Art

For accurate and secure mutual fixation of disk-shaped parts in particular, for example, in machining, for accurately chucking a workpiece on a table top, a pallet, etc., dowel pins or tapered pins have conventionally been used in combination with draw bolts, but despite their comparatively simple handling, these devices have the disadvantage that the fixation holes in the parts as well as the dowel pins themselves are subject to relatively rapid wear due to the frequently repeated changing operations, which then leads to inaccurate positioning of the parts. The tapered pins that are also used are much less susceptible to wear, but problems can occur with them when they fit too tightly in the tapered bore.

In addition, so-called expansion mandrels are also used especially in the manufacture of modern machine tools to compensate for different bore tolerances, but they cannot produce axial tightening forces between the two parts, which leads to inaccuracies with regard to the flatness of the two parts. This joining technique is described, for example, in the professional journal *Werkstatt und Betrieb* [Workshop and Operations], Vol. 127, pp. 609–614, Seegräber et al., "Expansion Chucking Technique—The Micron-Accurate Alternative" (1994). The expansion mandrels discussed in that publication are designed as one piece and the expansion area forms a portion of the mandrel. There is no actual expansion sleeve, but instead the radial widening of the expansion mandrel is accomplished by producing an internal hydraulic pressure in an annular chamber that is provided in the mandrel and is filled with a suitable liquid. These tensioning mandrels as well as tensioning mandrels with an expansion sleeve securely attached to their outer circumference are suitable for joining a cylindrical fitting part, but they cannot readily be used for joining in cases where axial restraint is also to be achieved because relative axial movements of the pairs of surfaces may occur in this case.

German patent publication 3,108,249 discloses an expansion chucking tool where an expansion sleeve is attached to a cylindrical body, and an annular space between these two parts is filled with a liquid that can be put under pressure, where the pressure required for chucking is maintained by a spring under tension without applying any external force.

Finally, German patent publication 3,007,307 discloses a shrink bond for two aligned shaft ends, where the two shaft ends are pushed in opposite directions into a sleeve made of a memory alloy. After positioning the shaft ends, the two-way effect of the memory alloy is utilized and the sleeve returns to its original shape.

SUMMARY OF THE INVENTION

A main purpose of the invention is to create chucking devices for accurate mutual fixation of disk-shaped parts or rotationally symmetrical parts to make it possible to compensate for the radial tolerance in bore diameters while at the same time permitting axial restraint of the parts.

For accurate mutual fixation of two parts in the shape of disks with coaxial boreholes, for example, an annular cylindrical pressure chamber filled with a medium is provided between the draw bolt and the expansion sleeve. In a chucking operation, the position of the expansion sleeve is fixed with respect to one of the parts, and when tightened, the draw bolt is displaced axially with respect to the stationary expansion sleeve, thus reducing the original volume of the annular cylindrical pressure chamber, which results in an increase in pressure in the pressure chamber and thus creates a pressure acting radially outward on the expansion sleeve. Owing to the elastic properties of the expansion sleeve, it is pressed against the walls of the two boreholes due to this increase in pressure in the annular cylindrical chamber. Because the sleeve is expandable, the clearance normally required for inserting a chucking device into the boreholes in the two parts is completely eliminated. If the draw bolt has a threaded section at its lower end and the lower part has a matching threaded bore or a matching nut, this change in volume of the pressure chamber can be achieved by a simple screwing action of the draw bolt while the axial position of the expansion sleeve is fixed. During the tightening operation, the two parts are pressed together with a defined force, thus resulting in an accurate flat position. Due to the radial widening of the expansion sleeve, the tolerance in the fit of the elements involved is compensated and the two parts are also joined together in a form-fitting manner as joining partners with mutual restraint. A long-lasting flat tightness is achieved by means of a tightening torque applied to the draw bolt by a tool. Thus the chucking operation can be carried out easily without any sliding friction simply by using a conventional screwdriver or wrench.

Another important advantage of the chucking device according to this invention consists of the fact that even with a pressure drop in the pressure chamber, the two parts are held together reliably because of the effective holding power, but this results in some play between the clamping sleeve and the borehole in the part being secured. Since there is no friction between the parts involved, which would cause wear, during the joining operation or even during working stresses, the chucking device according to this invention is especially suitable for joining parts when at least one part must be changed frequently, as is the case, for example, when chucking a workpiece on a base plate, a pallet, etc. Then each joining operation can be carried out quickly and easily because turning the draw bolt automatically results in centering, chucking and a form-fitting engagement in just one operation.

According to an advantageous embodiment of this invention, a possibility is provided for releasing the pressure in the pressure chamber. If necessary, some of the pressure medium can be drained out of the pressure chamber through a control valve, for example, thus making it possible to adjust the radial expansion of the expansion sleeve.

Another advantageous embodiment of this invention is characterized in that the draw bolt has a head designed for a screwdriver or wrench at one end and a threaded section at the other end that can be screwed into a stationary lock nut or a matching threaded borehole in the other part.

Finally, the draw bolt may also be designed as several parts, where a traditional stud bolt with a cylindrical shaft and a countersunk head is surrounded by a sleeve and the pressure chamber is located between the outside wall of this sleeve and the inside wall of the expansion sleeve.

The principle of the chucking device according to this invention can also be used for secure axial joining of parts that have rotational symmetry or a common axis, such as shafts, spindles, etc. For this purpose, the chucking device has a clamping sleeve that surrounds the joint area of the two parts in the manner of a union nut, where an expansion sleeve is provided according to this invention in an annular space between the two outside walls of the parts and the expansion sleeve, and together with the inside wall of the clamping sleeve it borders a sealed annular pressure chamber that is filled with a practically incompressible medium and has a volume that varies with axial movement of the clamping sleeve.

The clamping sleeve preferably has at one end an inside thread that meshes with an outside thread on one part and at its other end it has a collar that projects radially inward and in the fully clamped state is in contact with a matching inside ring collar of the expansion sleeve. This ring collar is then supported on a ring shoulder of one part.

To achieve the shape or inside space of the pressure chamber which varies in the chucking operation according to this invention, the expansion sleeve has an inside diameter that changes in its effective length area, so the desired change in pressure and radial expansion and shrinkage of the clamping sleeve are achieved through a relative axial movement between the draw bolt or the clamping sleeve and the expansion sleeve.

BRIEF DESCRIPTION OF THE DRAWING

The objects, features and advantages of this invention will be more readily perceived from the following detailed description when read in conjunction with the accompanying drawing, in which.

DETAILED DESCRIPTION OF THE PREFERRED EMBODIMENTS

Figure 1A:
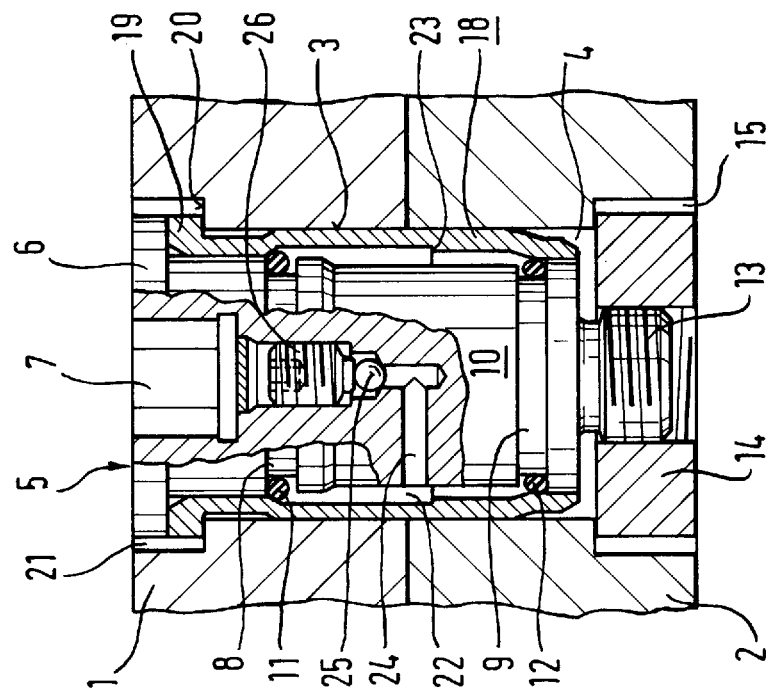
FIGS. 1a and 1b show a first embodiment in partial cross-section of the chucking device according to this invention in two operating states.
Figure 1B:
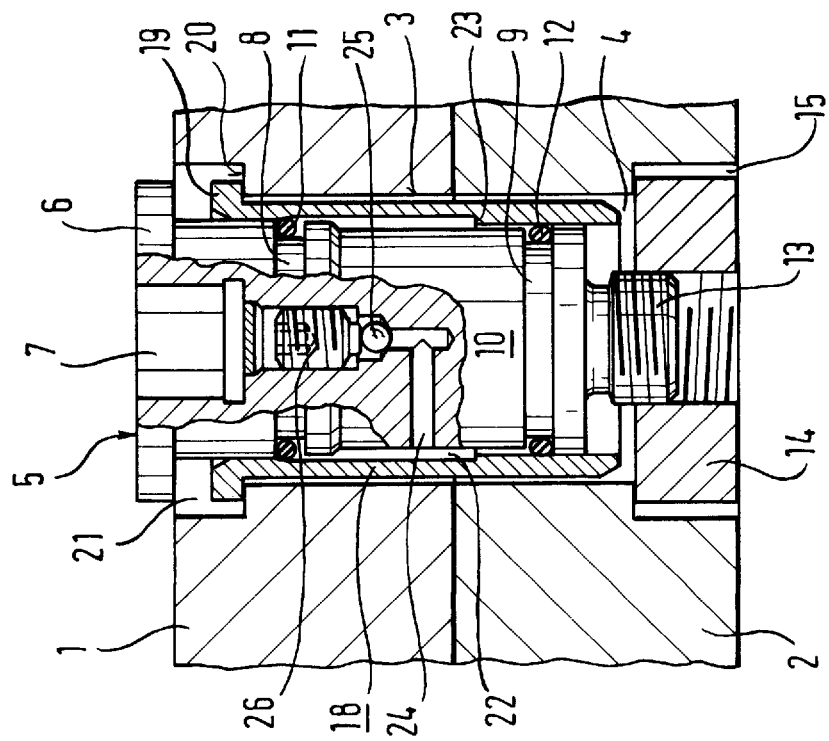

The chucking device illustrated in FIGS. 1a and 1b is used for securely but detachably joining two plates or disk-shaped members 1 and 2 (only the central bore areas of which are shown) that are provided with respective stepped drill holes 3 and 4. The chucking device in this embodiment includes a draw bolt 5 with an enlarged upper head 6 in the form of an annular disk, and a hexagonal recess 7 in its upper end for inserting a wrench with a matching head (not illustrated). Ring gaskets 11, 12 are provided in respective upper and lower ring grooves 8 and 9 in bolt shaft 10. Lower end 13 of bolt 10 has a reduced diameter and is provided with an outside thread which is screwed into polygonal nut 14 that is secured to prevent it from twisting in enlarged end section 15 of drill hole 4.

Expansion sleeve 18 is provided between the inside walls of drill holes 3, 4 and the outside wall of draw bolt 5. The expansion sleeve is supported with upper collar 19 on annular shoulder 20 formed by upper enlarged area 21 in drill hole 3 in upper plate 1. This expansion sleeve, together with the outside wall of bolt shaft 10, forms the border of annular cylindrical pressure chamber 22 that is in turn bordered axially by ring gaskets 11, 12. As illustrated here, the wall thickness of expansion sleeve 18 is reduced at shoulder 23 so the portion of pressure chamber 22 above shoulder 23 is larger than the portion below shoulder 23. This larger section of pressure chamber 22 is the operative area for the clamping function of this invention because as the draw bolt moves downwardly, gasket 11 reduces the volume of the pressure chamber.

Pressure relief channel 24 communicates with pressure chamber 22, is formed inside draw bolt 5 and can be closed off by a control valve. In the embodiment illustrated in FIGS. 1a and 1b, the control valve is formed by ball 25 that is pressed against a seat by set screw 26. Set screw 26 can be loosened as needed, so ball 25 can be raised from its seat and some of the medium in pressure chamber 22 can be drained out through the threads. This makes it possible to adjust the radial pressure of expansion sleeve 18 against the walls of the borehole.

The chucking device described above and illustrated in FIGS. 1a and 1b functions as described below. Draw bolt 5, together with clamping sleeve 18 which is permanently secured on it (by means not illustrated here), is inserted into holes 3, 4 in the two positioned members 1, 2 and is tightened by inserting a tool into hexagon-head recess 7. As illustrated in FIG. 1a, lower threaded section 13 is screwed into nut 14, and expansion sleeve 18 is supported with its collar 19 on annular shoulder 20, thus fixing its axial position. By turning bolt 7 further, there is a relative axial movement between shaft 10 of the bolt and the axially secured expansion sleeve 18. Because of the change in wall thickness of expansion sleeve 18 forming the previously discussed enlarged pressure chamber portion, as ring gasket 11 moves downwardly there is a reduction in the free volume of pressure chamber 22, which is filled with a practically incompressible medium such as a liquid or a gel. This results in a corresponding increase in pressure and a radial enlargement of expansion sleeve 18 whose outside wall moves outwardly to make close contact with the inside wall of the two drill holes 3,4. As soon as head 6 of draw bolt 5 is resting on collar 19 of clamping sleeve 18, a high axial clamping force can be produced by a slight further turn of the draw bolt because of the screw engagement of lower portion 13 of the bolt in nut 14. The fully chucked end state is illustrated in FIG. 1b.

Figure 2:
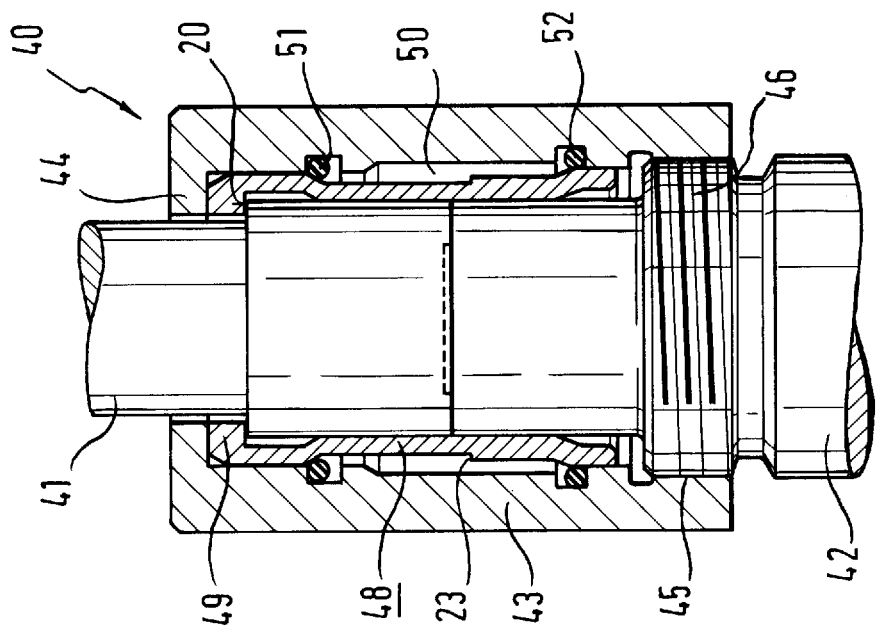
FIG. 2 is a partial cross sectional view of an alternative embodiment of the chucking device according to this invention for chucking two parallel disks.

The chucking device illustrated in FIG. 2 may also be used for secure and accurate chucking of disk-shaped members 1 and 2. The essential design of this chucking device corresponds to that of the embodiment illustrated in FIGS. 1a and 1b, where the same parts are labeled with the same numbers. In this embodiment, the draw bolt consists of several individual parts, including draw spindle 30 and bushing 31 surrounding it. Draw spindle 30 has enlarged head 32 with hexagon-head orifice 33 for insertion of a wrench, cylindrical shaft 34 and reduced diameter threaded section 35 at the end that is screwed into threaded hole 36 in lower member 2. Enlarged head 32 is accommodated in a suitably shaped recess 37 in the top part of bushing 31 which has an end collar 38 is supported on an annular shoulder at the end of this recess so that when draw spindle 30 is screwed in, bushing 31 is entrained. Pressure chamber 22, which is filled with a practically incompressible medium, is provided between the outside wall of bushing 31 and the inside wall of expansion sleeve 18 and is bordered axially by ring gaskets 11 and 12 that sit in matching ring grooves of the bushing. Again in this embodiment, expansion sleeve 18 has a reduced wall thickness portion, so the enlarged volume of pressure chamber 22 is reduced by screwing in draw spindle 30 and by the resulting axial displacement of bushing 31 and ring gasket 11, which is then compensated by radial widening of the expansion sleeve with a corresponding increase in pressure.

Figure 3:
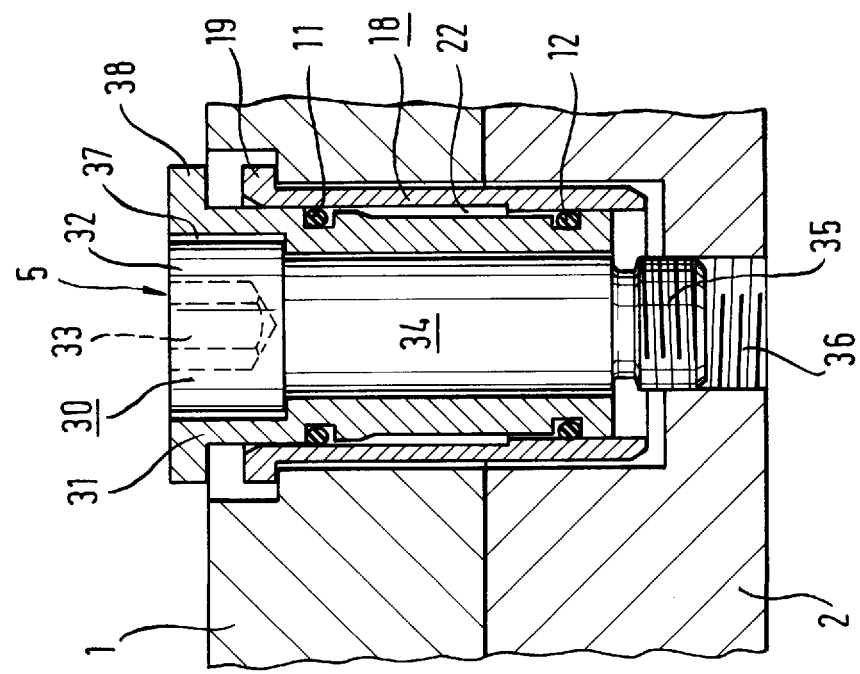
FIG. 3 is a partial cross sectional view of another embodiment of the chucking device according to this invention for chucking two rotationally symmetrical parts.

The embodiment of chucking device 40 according to this invention as illustrated in FIG. 3 assures mutual axial chucking of two rotationally symmetrical or common axis members 41, 42. These may consist of the shaft of a cutting tool and the shaft of a tool mount, for example. The chucking element is clamping sleeve 43 designed like a union nut having upper collar 44 that projects inward and lower threaded section 45 that works together with threaded section 46 on lower member 42. Expansion sleeve 48 is provided in the space bordered by the adjacent peripheral surfaces of members 41, 42 and the inside wall of clamping sleeve 43. The expansion sleeve rests with its upper ring collar 49 on matching ring shoulder 20 of upper member 41. The design and effect of this expansion sleeve correspond to those of expansion sleeves 18 used in the embodiments according to FIGS. 1 and 2. The wall thickness of this expansion sleeve is also reduced at ring step 23. Annular cylindrical pressure chamber 50 filled with a practically incompressible medium is provided between the inside wall of clamping sleeve 43 and the outside wall of expansion sleeve 48. It is bordered and sealed axially by ring gaskets 51, 52 which function as previously described.

In this embodiment according to FIG. 3, the joining operation is carried out as follows. After positioning members 41 and 42, clamping sleeve 43, which has already been placed on upper member 41, is screwed with its threaded section 45 onto threaded section 46 of lower member 42. In the course of this thread engaging movement expansion sleeve 48 comes to rest with its collar 49 on ring shoulder 20 of the upper member and is thus secured to prevent axial displacement. Again in this case, further turning of the clamping sleeve causes a reduction in the volume of pressure chamber 50 with a corresponding increase in pressure and radially inward directed pressure on the expansion sleeve that comes in pressure contact with the two butted ends of members 41 and 42. After ring collar 44 of clamping sleeve 43 comes in contact with ring collar 49 of expansion sleeve 48, chucking of the two members 41 and 42 in the axial direction is achieved by a slight further turn of clamping sleeve 43.

This invention is not limited to the embodiments illustrated here. Thus individual measures in the embodiments described here can also be combined in some other way, and a pressure relief channel that can be connected to pressure chamber 50 by a control valve may be provided in a suitable part of the clamping sleeve according to FIG. 3. In addition to liquids, it is also possible to use pasty substances and other suitable materials that produce compressive forces which act radially under an axial load and whose properties and effects are maintained even after a large number of joining operations as the medium to create the pressure acting on the expansion sleeve. The chucking devices according to this invention are especially suitable for securely and accurately chucking workpieces or tools on appropriate mounts on machine tools. However, they may also be used to advantage for very accurate but detachable fixation of other parts, such as disk packs, disk sets, etc.

What is claimed is:

1. A chucking device for accurate mutual fixation of coaxially positioned members having aligned boreholes, said device comprising:

a draw bolt positioned in the aligned boreholes in the members;

an expansion sleeve located between said draw bolt and inner walls of said boreholes; and a sealed annular cylindrical pressure chamber between said draw bolt and said expansion sleeve, said pressure chamber being filled with a medium exerting an adjustable expansion pressure on said expansion sleeve, said expansion sleeve being secured in the boreholes in the two members so it cannot be displaced axially;

said draw bolt in said expansion sleeve being mounted therein so that said draw bolt can be moved axially, one end of said bolt engaging the first of said members, the other end of said draw bolt being threadedly engaged in a threaded member of said borehole in the second of said members; wherein the volume of said pressure chamber changes due to axial movement of said draw bolt in said expansion sleeve, producing the expansion pressure that acts on said expansion sleeve to clamp said members together when the volume of said pressure chamber is reduced by axial movement of said draw bolt.

2. The chucking device according to claim 1, wherein said expansion pressure acting on said expansion sleeve causes said pressure chamber to form a narrow part and a broad part, and wherein said axial movement of said draw bolt causes a volume reduction of said broader part of said pressure chamber.

3. The chucking device according to 2, wherein the expansion pressure produced by the medium in said pressure chamber is adjustable by means of an internal valve arrangement.

4. The chucking device according to claim 3, wherein said draw bolt has a head shaped and configured to accommodate a tool to facilitate tightening or loosening of the threaded engagement between said draw bolt and said second member.

5. The chucking device according to claim 2, wherein said draw bolt comprises a socket-head bolt with a threaded section at the end and a bushing surrounding at least the shaft of the bolt, where said pressure chamber is provided between the outside wall of said bushing and the inside wall of said expansion sleeve.

6. The chucking device according to claim 5, wherein the wall thickness of the said expansion sleeve changes over an effective length area of said expansion sleeve.

7. The chucking device according to claim 2, wherein said draw bolt has a head shaped and configured to accommodate a tool to facilitate tightening or loosening of the threaded engagement between said draw bolt and said second member.

8. The chucking device according to claim 2, wherein the wall thickness of the said expansion sleeve changes over an effective length area of said expansion sleeve.

9. A chucking device for accurate mutual axial fixation of rotationally symmetrical, axially aligned, abutting members, said device comprising:

a clamping sleeve surrounding areas abutting said members in the manner of a union nut;

an expansion sleeve encompassing adjacent portions of said members and being positioned between said members and said clamping sleeve; and means forming a sealed annular cylindrical pressure chamber which is filled with a medium and has a volume that changes under a radially inwardly directed force acting on said expansion sleeve;

said clamping sleeve is threadedly engaged with one of said members and has a collar projecting radially inward which captures one end of said expansion sleeve and the other one of said members;

said expansion sleeve being positioned between said collar and the other one of said members so it cannot be displaced axially; wherein the volume of said pressure chamber changes due to an axial feed movement of said clamping sleeve with respect to said expansion sleeve, thereby producing expansion forces that act on said expansion sleeve.

10. A chucking device for accurate mutual fixation of coaxially positioned members having aligned boreholes, said device comprising:

a draw bolt positioned in the aligned boreholes in the members;

an expansion sleeve located between said draw bolt and inner walls of said boreholes; and a sealed annular cylindrical pressure chamber between said draw bolt and said expansion sleeve, said pressure chamber being filled with a medium exerting an adjustable expansion pressure on said expansion sleeve, said expansion pressure being adjustable by means of an internal valve arrangement, said expansion sleeve being secured in the boreholes in the two members so it cannot be displaced axially;

said draw bolt in said expansion sleeve being mounted therein so that said draw bolt can be moved axially, one end of said draw bolt engaging the first of said members, the other end of said draw bolt being threadedly engaged in a threaded member of said borehole in the second of said members; wherein the volume of said pressure chamber changes due to axial movement of said draw bolt in said expansion sleeve, producing the expansion pressure that acts on said expansion sleeve to clamp said members together when the volume of said pressure chamber is reduced by axial movement of said draw bolt.

11. A chucking device for accurate mutual fixation of coaxially positioned members having aligned boreholes, said device comprising:

a draw bolt comprising a socket-head bolt with a threaded section at the end and a bushing surrounding at least the shaft of said draw bolt, said draw bolt being positioned in the aligned boreholes in the members;

an expansion sleeve located between said draw bolt and inner walls of said boreholes; and a sealed annular cylindrical pressure chamber provided between the outside wall of said bushing and the inside wall of said expansion sleeve, said pressure chamber being filled with a medium exerting an adjustable expansion pressure on said expansion sleeve, said expansion pressure produced by the medium in said pressure chamber is adjustable by means of an internal valve arrangement, said expansion sleeve being secured in the boreholes in the two members so it cannot be displaced axially;

said draw bolt in said expansion sleeve being mounted therein so that said draw bolt can be moved axially, one end of said draw bolt engaging the first of said members, the other end of said draw bolt being threadedly engaged in a threaded member of said borehole in the second of said members; wherein the volume of said pressure chamber changes due to axial movement of said draw bolt in said expansion sleeve, producing the expansion pressure that acts on said expansion sleeve to clamp said members together when the volume of said pressure chamber is reduced by axial movement of said draw bolt.

12. A chucking device for accurate mutual fixation of coaxially positioned members having aligned boreholes, said device comprising:

a draw bolt positioned in the aligned boreholes in the members;

an expansion sleeve located between said draw bolt and inner walls of said boreholes; and a sealed annular cylindrical pressure chamber between said draw bolt and said expansion sleeve, said pressure chamber being filled with a medium exerting an adjustable expansion pressure on said expansion sleeve, said expansion pressure produced by the medium in said pressure chamber is adjustable by means of an internal valve arrangement, said expansion sleeve being secured in the boreholes in the two members so it cannot be displaced axially and formed with a collar at one end that rests on a stationary ring shoulder on one of said members;

said draw bolt in said expansion sleeve being mounted therein so that said draw bolt can be moved axially, one end of said draw bolt engaging the first of said members, the other end of said draw bolt being threadedly engaged in a threaded member of said borehole in the second of said members; wherein the volume of said pressure chamber changes due to axial movement of said draw bolt in said expansion sleeve, producing the expansion pressure that acts on said expansion sleeve to clamp said members together when the volume of said pressure chamber is reduced by axial movement of said draw bolt.

13. A chucking device for accurate mutual fixation of coaxially positioned members having aligned boreholes, said device comprising:

a draw bolt positioned in the aligned boreholes in the members;

an expansion sleeve located between said draw bolt and inner walls of said boreholes; and a sealed annular cylindrical pressure chamber between said draw bolt and said expansion sleeve, said pressure chamber being filled with a medium exerting an adjustable expansion pressure on said expansion sleeve, said expansion pressure produced by the medium in said pressure chamber is adjustable by means of an internal valve arrangement, said expansion sleeve being secured in the boreholes in the two members so it cannot be displaced axially, and wherein a wall thickness of the said expansion sleeve changes over an effective length area of said expansion sleeve;

said draw bolt in said expansion sleeve being mounted therein so that said draw bolt can be moved axially, one end of said draw bolt engaging the first of said members, the other end of said draw bolt being threadedly engaged in a threaded member of said borehole in the second of said members; wherein the volume of said pressure chamber changes due to axial movement of said draw bolt in said expansion sleeve, producing the expansion pressure that acts on said expansion sleeve to clamp said members together when the volume of said pressure chamber is reduced by axial movement of said draw bolt.

14. A chucking device for accurate mutual fixation of coaxially positioned members having aligned boreholes, said device comprising:

a draw bolt comprising a socket-head bolt with a threaded section at the end and a bushing surrounding at least the shaft of said draw bolt and positioned in the aligned boreholes in the members;

an expansion sleeve located between said draw bolt and inner walls of said boreholes; and a sealed annular cylindrical pressure chamber provided between the outside wall of said bushing and the inside wall of said expansion sleeve, said pressure chamber being filled with a medium exerting an adjustable expansion pressure on said expansion sleeve, said expansion sleeve being secured in the boreholes in the two members so it cannot be displaced axially and formed with a collar at one end that rests on a stationary ring shoulder on one of said members, said draw bolt in said expansion sleeve being mounted therein so that said draw bolt can be moved axially, one end of said draw bolt engaging the first of said members, the other end of said draw bolt being threadedly engaged in a threaded member of said borehole in the second of said members; wherein the volume of said pressure chamber changes due to axial movement of said draw bolt in said expansion sleeve, producing the expansion pressure that acts on said expansion sleeve to clamp said members together when the volume of said pressure chamber is reduced by axial movement of said draw bolt.

15. A chucking device for accurate mutual fixation of coaxially positioned members having aligned boreholes, said device comprising:

a draw bolt positioned in the aligned boreholes in the members;

an expansion sleeve located between said draw bolt and inner walls of said boreholes; and a sealed annular cylindrical pressure chamber between said draw bolt and said expansion sleeve, said pressure chamber being filled with a medium exerting an adjustable expansion pressure on said expansion sleeve, said expansion sleeve being secured in the boreholes in the two members so it cannot be displaced axially and formed with a collar at one end that rests on a stationary ring shoulder on one of said members;

said draw bolt in said expansion sleeve being mounted therein so that said draw bolt can be moved axially, one end of said draw bolt engaging the first of said members, the other end of said draw bolt being threadedly engaged in a threaded member of said borehole in the second of said members; wherein the volume of said pressure chamber changes due to axial movement of said draw bolt in said expansion sleeve, producing the expansion pressure that acts on said expansion sleeve to clamp said members together when the volume of said pressure chamber is reduced by axial movement of said draw bolt.

* * * * *

UNITED STATES PATENT AND TRADEMARK OFFICE
Certificate

Patent No. 5,769,487                                    Patented: June 23, 1998

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Gerhard Michler and Thomas Retzbach.

Signed and Sealed this Sixteenth Day of February, 1999.

ANDREA L. PITTS
*Supervisory Patent Examiner*
Art Unit 3722